United States Patent [19]
Hayden

[11] 3,786,462
[45] Jan. 15, 1974

[54] CARBON MONOXIDE ALARM FOR AUTOMOBILES

[75] Inventor: Rodney Hayden, Stoney Creek, Ontario, Canada

[73] Assignee: TRW Inc., Cleveland, Ohio

[22] Filed: Nov. 24, 1971

[21] Appl. No.: 201,682

[52] U.S. Cl. .......... 340/237 R, 23/255 E, 340/52 R
[51] Int. Cl. .......................................... G08b 21/00
[58] Field of Search ............... 340/237 R, 52 R; 23/255 E, 254 E

[56] References Cited
UNITED STATES PATENTS
3,609,732  9/1971  Kasahara et al. ............... 340/237 R Primary Examiner—John W. Caldwell
Assistant Examiner—Daniel Myer
Attorney—Philip E. Parker et al.

[57] ABSTRACT

A carbon monoxide alarm device for installation in an automobile in which a vented casing contains a fuel cell having first and second electrodes in fixed space relationship within a porous body having an oxidation catalyst and is connectable by three terminals to chassis ground, the ignition circuit and to a load, the same being insertable into a mounting at a suitable location in the automobile to give a warning by actuation of the load, the latter being in the form of an electrical buzzer or lamp or both and located internally or externally of the casing.

5 Claims, 3 Drawing Figures

PATENTED JAN 15 1974  3,786,462

INVENTOR
RODNEY HAYDEN
BY
Gordon Needleman
ATTORNEY 3,786,462

CARBON MONOXIDE ALARM FOR AUTOMOBILES

BACKGROUND OF THE INVENTION

This invention relates to a carbon monoxide alarm for automobiles.

In spite of improvements in automobile air conditioning systems for the circulation of air and the controlled introduction of fresh air into an automobile, recent studies have indicated that a very small presence of carbon monoxide in such systems over a long period of time may cause driving problems. Exposure to greater than 50 parts per million of carbon monoxide for periods in excess of 1 hour can have perceptible effects on the judgment of the driver, although substantially twice this concentration is ordinarily regarded as the level for the onset of perceptible effects after 3 hours exposure. As a general rule, concentrations in excess of 1,000 parts per million for 1 hour will endanger life. Carbon monoxide concentrations above 600 parts per million cause headache and nausea. Above 300 parts per million definite perceptible effects as, for example, drowsiness and lack of reaction and judgment take place.

SUMMARY OF THE INVENTION

Under modern driving conditions it is deemed important to provide a warning to the driver of concentrations of carbon monoxide, in particular, concentrations which exceed a predetermined level, for example, 50 parts per million.

It is the main object of this invention to provide a carbon monoxide alarm for an automotive vehicle adapted to warn the driver when carbon monoxide in the atmosphere within the vehicle exceeds a predetermined value.

It is another object of the invention to provide a carbon monoxide alarm adapted to provide a signal to the operator of an automotive vehicle through the actuation of one or more load devices, such as a warning light, an alarm actuating relay, a buzzer, a control relay or other device.

With the foregoing and other objects in view, the invention generally concerns a carbon monoxide alarm device for automotive vehicles and comprises in combination: a hollow casing having vents therein; an ignition terminal, a load terminal and a ground connection extending from said casing; a fuel cell within said casing having a first electrode connecting to said ignition terminal; a second electrode in said fuel cell spaced in fixed relationship to said first electrode; and means in said casing responsive to a difference of electrical potential between said first and second electrodes for energizing said load terminal.

Other objects will be appreciated by a study of the following specification in conjunction with a viewing the accompanying drawings.

DESCRIPTION OF THE PREFERRED EMBODIMENT

Figure 1:
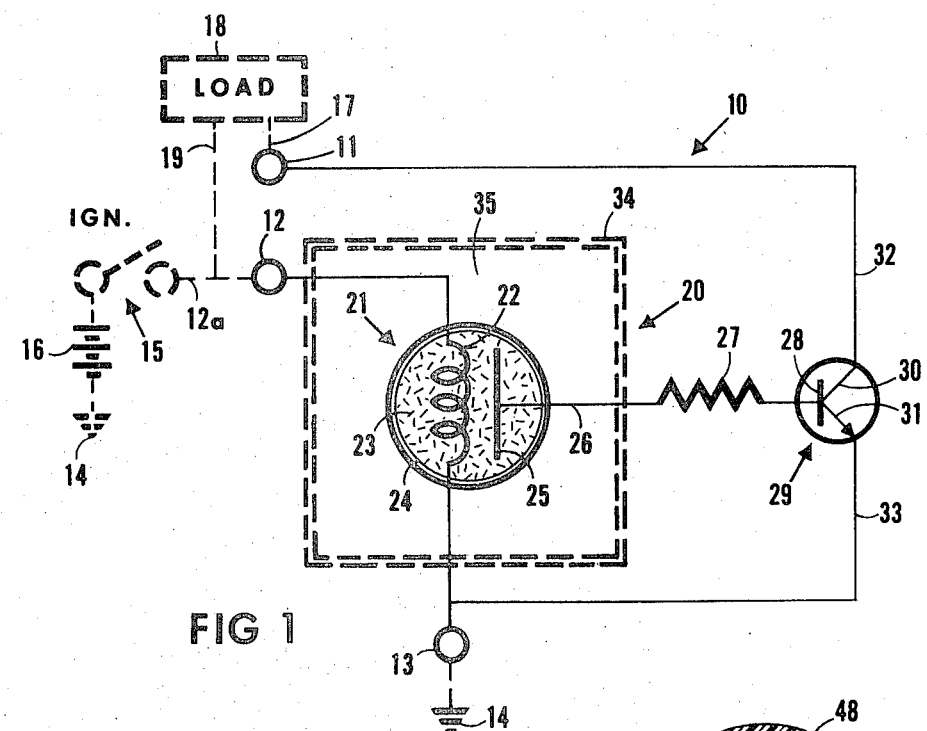
FIG. 1 is an electrical schematic diagram of a carbon monoxide alarm device according to the invention.

Referring to the drawings and especially FIG. 1, the invention contemplates a carbon monoxide alarm device 10 having terminals 11 and 12 and a ground terminal 13 adapted to be connected to chassis ground 14. Terminal 12 will be referred to hereafter as an ignition terminal adapted to be connected for example by line 12a to ignition switch 15 which is in turn connected to the car battery source 16 and to chassis ground 14. Terminal 11 may be regarded as the load terminal adapted to be connected by line 17 to load 18 to serve as the ground side of said load, the other terminal of said load being connected by line 19 to the ignition terminal 12.

A carbon monoxide detector 20 is provided in the form of a fuel cell 21 comprising a first electrode preferably in the form of a heating element 22 connected between the ignition and ground terminals 12 and 13 and generating heat of the order of about 600° C, said heating element being fixed within a ceramic body 23 preferably comprising silica and alumina and thus being of porous refractory nature. Preferably, but not essentially, the body 23 contains a metal oxide. The second electrode or collector 25 should preferably have a surface area of the same order of magnitude as the surface area of the filament of heater 22 and be connected by line 26 through the sensitivity resistor 27 to the base 28 of a transistor 29 of the (NPN type). The collector 30 and emitter 31 of the transistor 29 are connected to load terminal 11 and ground terminal 13 by lines 32, 33 respectively. Electrode 22 is preferably formed of a palladium iridium alloy (80%, 20%) for very long life under oxidizing conditions. If it be assumed that the porous body contains air, the infusion of carbon monoxide into said body in the presence of the catalytic layer or coating 24 causes oxidation of the carbon monoxide thereby releasing ions. There are a number of explanations for the phenomena which takes place by means of which current may flow from terminal 12 and electrode 22 to the electrode 25 to render the transistor 29 conducting responsive to the concentration of carbon monoxide between the electrodes 22, 25. The value of resistor 27 adjusts the sensitivity of the fuel cell detector 20 and is preferably set at a value generating a signal sufficient to energize the load at a carbon monoxide concentration of 100 parts per million. As indicated in FIG. 1, the fuel cell 21 is preferably surrounded by a metal screen 34, frequently referred to as a "Davey" screen, for the purpose of confining any gas combustion flame to the interior 35 thereof thus avoiding any ignition of exterior carbon monoxide or other combustible gases or vapors.

Figure 2:
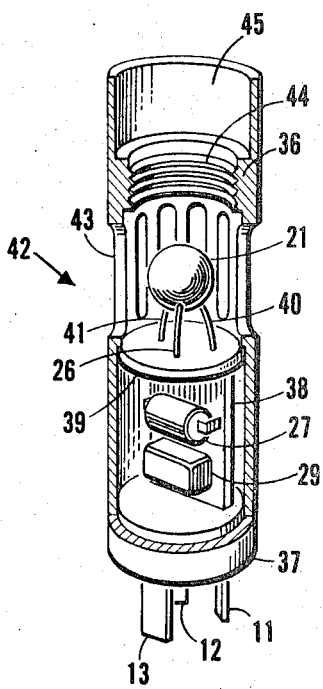
FIG. 2 is a perspective view of one form of a carbon monoxide alarm device according to the invention, cut away to reveal certain of the internal components.
Figure 3:
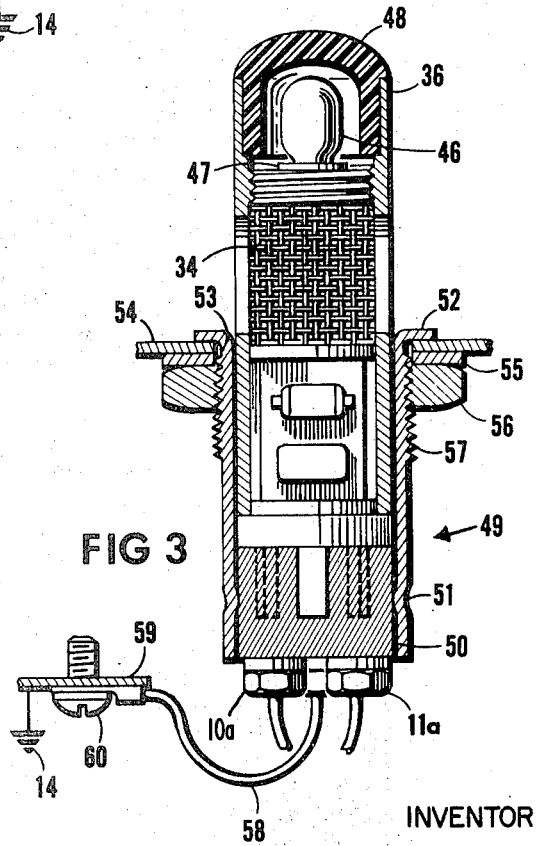
FIG. 3 is a sectional view of the device of FIG. 2 in assembly in a mounting socket, for example, in a mounting provided on the dashboard of an automobile and illustrating a ground connection therefor and a warning light forming a part of the device.

In its mechanical form, the invention is of the preferred arrangement of FIGS. 2 and 3 in which a tubular casing 36 preferably of a size of the order of a lipstick casing, i.e. of the order of about ½ inch diameter and 2 inches in length, is supported on an insulate base 37 fixed thereto and carrying an insulate wafer 38 mounting a resistor 27 and a transistor 29 connected, according to the circuit of FIG. 1, through wafer 38 to fuel cell supporting base 39 and to the electrode connectors 40, 41 and 26 of fuel cell 21 located in a vented region 42 by reason of the radial slots 43 in the casing 36. Wafer 38 also connects the components connected thereto to the lower exteriorally depending terminals 11, 12 and 13 corresponding to the like numbered terminals of FIG. 1. An internally threaded portion 44 and upper socket part 45 carry a warning lamp 46 in a socket 47 which is turned into internally threaded portion 44 and connected through leads (not shown) to terminals 11 and 15. As indicated in FIG. 3, an external lens 48 may be seated within socket 45. Screen envelope 34 rests within container 30 in the region of the slots 43 and is disposed about the fuel cell 21.

The warning device of FIG. 2 plugs into a mounting socket 49 carrying an insulate base 50 to which it is crimped at 51 and the socket includes an outwardly directed mounting flange 52 which seats against the lip of an opening 53 in a mounting element 54, for example, a portion of a dashboard. The socket 49 is retained in the assembly with the mounting element 54 by a washer 55 and nut 56 turned onto the external socket threads 57. The socket base 50 carries conventional electrical connectors (not shown) adapted to accept the electrodes 11, region and 13 and communicates such connection by nut terminals 10a and 11a to an external load device if desired, and also provides ground wire 58 connected by terminal 59 and screw 50 to chassis ground 14 on the frame of an automotive vehicle.

The device of the invention is also sensitive to other combustible gases. Fumes from the crankcase, the exhaust or by way of evaporation of gasoline from improper carburation or faulty gas line connections, should be called to the attention of the driver by way of a warning signal of some kind. The invention is therefore concerned with air pollution as it may occur within the vehicle itself, especially where automotive air conditioning systems which are used, which will tend to circulate higher density combustible gases from the floor level of the automobile throughout the atmosphere. The invention is particularly useful in winter driving and in driving for prolonged periods of time, especially to warn drivers against conditions which may cause drowsiness and reduced mental alertness.

While a specific form of the invention has been set forth in detail, in order better to illustrate the manner of contriving one form thereof, it will be understood that the invention concerns a carbon monoxide alarm device in the form of a hollow casing; an ignition terminal, a load terminal and a ground connection extending from said casing; a fuel cell within said casing having a first electrode connecting to said ignition terminal; a second electrode in said fuel cell spaced in a fixed relationship to said first electrode; and means in said casing for energizing said load terminal responsive to a difference in electrical potential between said first and second electrodes, said means being in the form of a voltage responsive current device connected between the load terminal and the ground connection and a sensitivity determining resistor connected between said second electrode and said voltage responsive current device. Depending upon the degree to which suitable catalysts are present in the fuel cell, the connection of the first electrode in such manner as to utilize the same as a heater is not essential. For example, a palladium-iridium filament heater in an alumina silica porous refractory body in the presence of tin on the outer surfaces of the latter develops a readily measurable potential difference between the electrodes at 30° centigrade temperature, in which event the means responsive to said potential difference may embody a voltage amplifier and such a modification is deemed to be contemplated by the invention claimed hereinafter.

I claim:

1. An alarm device for warning an operator of the presence of noxious gases in an automotive vehicle comprising, in combination, a hollow casing having slots in a portion of its external wall, three electrical terminals extending from said casing, one of said terminals being connected to the vehicle's ignition system, one of said terminals being connected to a load and one of said terminals being connected to ground potential, a fuel cell mounted within said casing adjacent said slotted wall portion thereof, said fuel cell having a first electrode connected to said terminal connected to the vehicle's ignition system and said ground terminal and a second electrode spaced from said first electrode and connected through a sensitivity resistor to a voltage responsive current device, both said resistor and said device being mounted within said casing and said device being connected to said load terminal and said grOund terminal, said casing being housed in a mounting socket adapted to rigidly connect said casing to a support in the interior of a vehicle such that said slotted portion of said casing is exposed to the internal atmosphere of the vehicle, whereby the presence of noxious gases in said vehicle results in a change in electrical potential between said fuel cell electrodes, which change is sensed by said resistor and communicated to said voltage responsive current device which in turn energizes said load to warn the operator of the presence of the gases.

2. An alarm device according to claim 1 additionally including a "Davey" screen mounted in said casing and surrounding said fuel cell.

3. An alarm device according to claim 1 wherein said load is a lamp mounted in said casing so as to be exposed to operator view when said socket is secured to a vehicle support.

4. An alarm device according to claim 1 wherein said first electrode in said fuel cell is a heating element.

5. An alarm device according to claim 4 wherein said fuel cell includes a body of porous material of a refractory nature surrounding said electrodes of said cell, said body having a layer of catalytic material thereon.

* * * * *

UNITED STATES PATENT OFFICE
CERTIFICATE OF CORRECTION

Patent No. 3,786,462  Dated January 15, 1974

Inventor(s) Rodney Hayden

It is certified that error appears in the above-identified patent and that said Letters Patent are hereby corrected as shown below:

On the cover sheet insert:

-- [30] Foreign Application Priority Data

Canada  108,049  March 18, 1971  --.

Column 3, line 21, delete "region" and insert -- 12 --.

Signed and sealed this 29th day of October 1974.

(SEAL)
Attest:

McCOY M. GIBSON JR.
Attesting Officer

C. MARSHALL DANN
Commissioner of Patents